Figure 1:
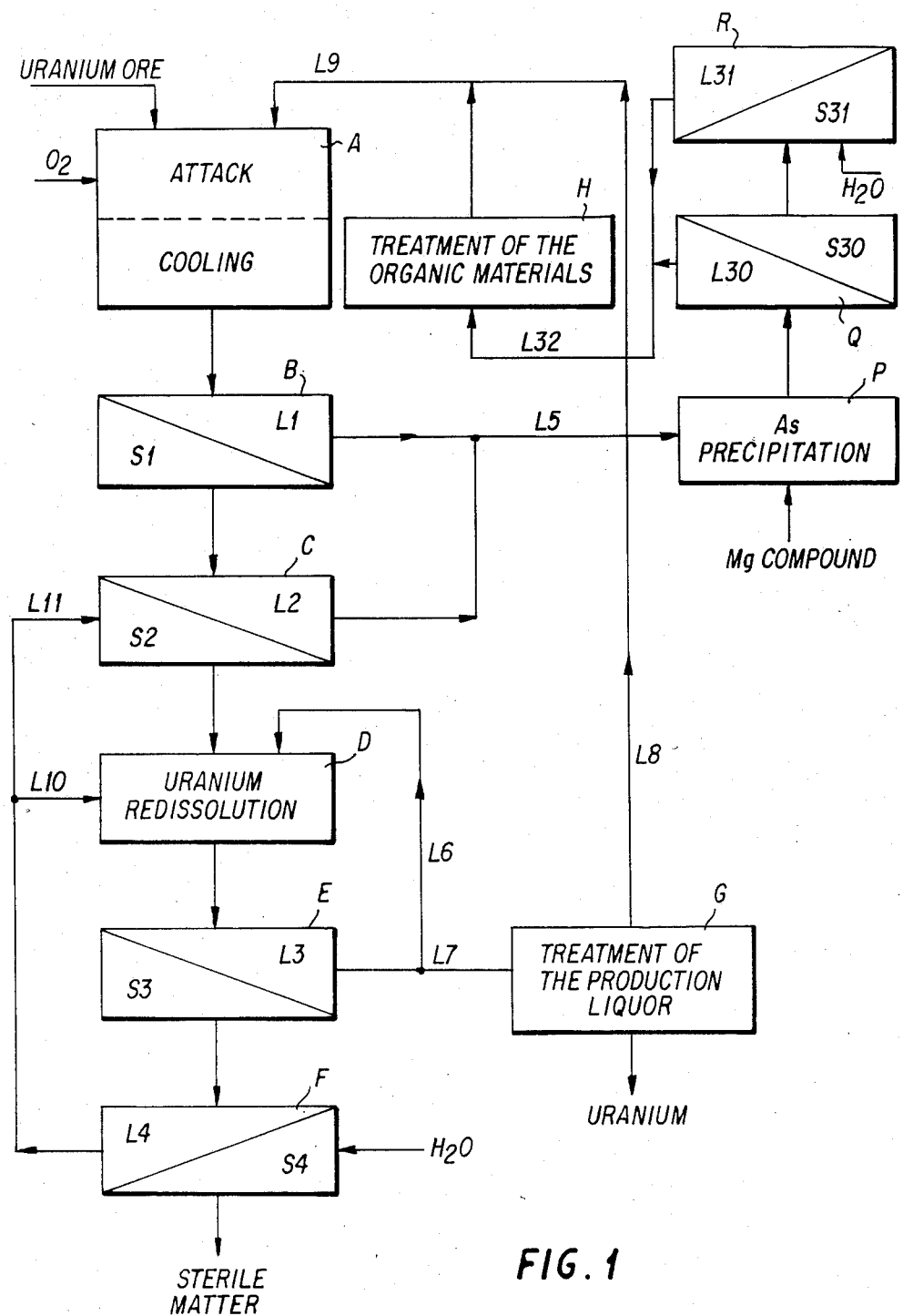

United States Patent [19]
Maurel et al.

[11] Patent Number: 4,634,579
[45] Date of Patent: Jan. 6, 1987

[54] SELECTIVE REMOVAL OF ARSENICAL MATERIAL IN THE COURSE OF AN ALKALINE PROCESS FOR TREATING A URANIFEROUS AND/OR MOLYBDENIFEROUS ORE BY MEANS OF A MAGNESIUM COMPOUND

[75] Inventors: Pierre Maurel, Aix en Provence; Jean-Michel Lamerant, Bouc Bel Air; Francois Pallez, Aix en Provence, all of France

[73] Assignee: Aluminium Pechiney, Paris, France

[21] Appl. No.: 474,597

[22] PCT Filed: Jul. 27, 1982

[86] PCT No.: PCT/FR82/00128
§ 371 Date: Mar. 7, 1983
§ 102(e) Date: Mar. 7, 1983

[87] PCT Pub. No.: WO83/00509
PCT Pub. Date: Feb. 17, 1983

[30] Foreign Application Priority Data
Jul. 29, 1981 [FR] France ................................ 81 15066

[51] Int. Cl.[4] ...................... C22B 60/02; C22B 30/04
[52] U.S. Cl. ......................................... 423/17; 423/15; 423/55; 423/87
[58] Field of Search ........................ 423/15, 17, 55, 87

[56] References Cited

U.S. PATENT DOCUMENTS

| | | | |
|---|---|---|---|
| 2,079,805 | 5/1937 | Judd | 423/56 |
| 2,951,741 | 9/1960 | Sill | 423/87 |
| 4,272,490 | 6/1981 | Sefton et al. | 423/18 |
| 4,366,128 | 12/1982 | Weir et al. | 423/18 |
| 4,406,864 | 9/1983 | Weir et al. | 423/9 |
| 4,423,010 | 12/1983 | Maurel | 423/15 |

FOREIGN PATENT DOCUMENTS

1269600 6/1968 Fed. Rep. of Germany .

*Primary Examiner*—John F. Terapane
*Assistant Examiner*—Virginia B. Caress
*Attorney, Agent, or Firm*—Oblon, Fisher, Spivak, McClelland, & Maier

[57] ABSTRACT

A process for the selective removal of arsenical material in the course of a process for the hot oxidizing attack on a uraniferous and/or molybdeniferous ore containing arsenical materials, comprising attacking said ore with an aqueous liquor of sodium or potassium carbonate and/or bicarbonate, said attack operation being carried out under conditions with respect to levels of concentration, temperatures and pressures which cause solubilization of the uranium and/or molybdenum and the arsenic present in the ore, then collecting a suspension of a solid phase in a liquid phase, and finally, separating said phases, wherein the arsenic which is solubilized in the attack operation is extracted in the form of magnesium arsenate by treating the material containing the arsenic with a magnesium compound.

10 Claims, 2 Drawing Figures

SELECTIVE REMOVAL OF ARSENICAL MATERIAL IN THE COURSE OF AN ALKALINE PROCESS FOR TREATING A URANIFEROUS AND/OR MOLYBDENIFEROUS ORE BY MEANS OF A MAGNESIUM COMPOUND

The present invention concerns a process for the selective removal of arsenical material in the form of magnesium arsenate in the course of a continuous process for the oxidising attack on a uraniferous and/or molybdeniferous ore containing arsenic as an impurity, by means of an aqueous liquor containing alkali metal carbonate and bicarbonate in solution, under conditions of concentration, temperature and pressure causing solubilisation of the uranium and/or molybdenum present in the ore.

It has long been known for the alkaline attack on uraniferous ores containing alkaline-earth metal carbonates such as calcium and magnesium carbonates in substantial quantities to be effected preferentially by means of an aqueous liquor of sodium carbonate and bicarbonate, the concentration of those two components in the liquor being increased in proportion to increasing refractoriness of the ore.

The attack operation is generally carried out in an oxidising medium which is produced for example by blowing free oxygen into the hot reaction medium in order to permit oxidation of the uranium and/or molybdenum and solubilisation thereof, but also to ensure oxidation of the sulphides of impurities, which are present in the ore.

However, it may happen that the uraniferous and/or molybdeniferous ores contain arsenic, which is a particularly troublesome impurity, a fraction of the arsenic being solubilised in the attack operation in the form of alkali metal arsenate, while the other fraction which occurs in a refractory arsenical form is unaffected by the attack operation and is removed with the sterile matter.

Hence, the absence of any treatment for removing the arsenic which is solubilised during the ore attack operation gives rise to major disadvantages which may have a detrimental effect on the quality of the materials produced.

In fact, the suspension resulting from the attack operation, when subjected to a separation operation, provides for recovery of liquid and solid phases.

The solid phase which is formed by sterile matter and the undissolved arsenical fraction is impregnated with the uraniferous and/or molybdeniferous liquor containing the arsenic resulting from the attack operation, and is then washed by means of water or an aqueous recycling liquor to recover the impregnation liquor.

The liquid phase which contains in solution alkali metal carbonate and bicarbonate, uranium and/or molybdenum, and arsenic which is solubilised in the attack operation, constitutes the production liquor which, when mixed with the liquor resulting from the operation of washing the solid phase, is subsequently treated by means known to the man skilled in the art to extract therefrom the uranium and/or molybdenum, before the liquor, after having had its uranium and/or molybdenum content removed in that way, is possibly recycled to one of the steps in the ore attack procedure.

The effect of recycling the liquor with its reduced uranium and/or molybdenum content to the ore attack operation, as referred to above, is a continuous and progressive increase in the proportion of arsenic in all the steps in the process for producing the uranium and/or molybdenum as a useful product, and in particular in the production liquor which is intended to extract the element or elements which are to form the useful product.

Accordingly, the proportion of arsenic in the uraniferous and/or molybdeniferous precipitate increases in a correlated manner and may be such as to prevent exploitation of the concentrate of the element or elements which are to form the useful product.

Hence, it is found necessary to carry out a process for the selective extraction of arsenic in such a way that uraniferous and/or molybdeniferous ores which contain that impurity in particular can be the subject of industrial exploitation.

Various treatment processes which are known to the man skilled in the art have been suggested in an effort to overcome the problem which arises by virtue of the presence of arsenic in the uraniferous and/or molybdeniferous production liquors.

A first process which is well known to the man skilled in the art has been proposed (Gmelin's Handbuch der Anorg. Chemie, Eisen, B Part 4, 1931, page 59), which comprises acidifying the carbonated liquor to be purified to give a pH-value in the region of 3.5, adding an iron compound in the Fe(III) state in order to precipitate iron arsenate which can be subsequently removed by a physical separtaion operation. Such a process suffers from many disadvantages, such as for example the disadvantage of acidifying the whole of the carbonated liquor to be purified, causing destruction of the carbonate and bicarbonate present and requiring that liquor to be regenerated by a make-up amount of alkali metal carbonate and bicarbonate. In addition, it is also necessary to remove from the medium the anion produced by acidification as well as that combined with the iron in the ferric compound used for removing the arsenic.

Another process which is also known results in the precipitation of arsenic in the form of an ammonium magnesium compound of the formula $AsO_4NH_4Mg$, as referred to in Manuel de Chimie analytique, volume 1, page 241 by TREADWELL (Dunod 1939), by the introduction of ammonia and/or an ammoniated compound and a magnesium compound. That process suffers from the serious disadvantage of introducing $NH_3$ into the whole of the treatment cycle, and that compound is more particularly manifested by its presence in the sterile matter and the gaseous effluents resulting from the attack operation, giving rise to the necessity for treatment to remove ammonia in order to comply with restrictions on environmental pollution.

In addition, another process which is also known, as described in U.S. Pat. No. 2,079,805, comprises attacking a wulfenite ore which is mixed beforehand with sodium nitrate and/or hydroxide, by high-temperature calcination, followed by leaching by means of water to produce a liquor containing the solubilised sodium molybdate as well as solubilised arsenic and phosphorous, separating the sterile matter from the above-mentioned liquor, neutralising the liquor separated for example by means of nitric acid in order to remove therefrom all the $CO_2$ present, before extracting therefrom the phosphorus and arsenic in the form of magnesium phosphate and arsenate by the addition of $MgCl_2$. However, that process suffers from the major disadvantage of requiring total removal of the $CO_3^{--}$ and/or $HCO_3^-$ which are present in solution at the moment of removing the arsenic in the form of magnesium arsenate.

Finally, another process which is disclosed in French Pat. No. 2,404,601, in an effort to overcome the problem arising out of the presence of arsenic in the uraniferous and/or molybdeniferous production liquors, proposes caustifying the liquor resulting from precipitation of the uranium, before recycling it to the attack operation.

However, such a process not only results in the removal of arsenic in the form of calcium arsenate but also results in the carbonates present being removed. Hence, and after such a treatment, the liquor which is recycled to the attack operation is unsuitable for such an operation unless the proportions therein of sodium or potassium carbonate and bicarbonate are first restored before that operation is carried out.

In addition, using such a process for removing arsenic from solutions which also contain carbonate and bicarbonate does not permit the arsenic to be removed selectively, while the user is left faced with serious disadvantages such as the production of a precipitate which contains calcium carbonate and arsenate in mixed form.

Hence, in spite of the low degree of solubility of the calcium arsenate present in the solid effluent, that calcium arsenate may give rise to environmental pollution and may require particular and expensive precautions to be taken for storage thereof, by virtue of its being mixed with the other salts removed.

It therefore appears to be a desirable and attractive proposition for the arsenic to be extracted selectively in a form which permits it to be put to use or which permits it to be stored in any easy and non-polluting manner.

It is for this reason that, continuing their research in this field, the applicants have now found that it was possible to extract the arsenic by means of a novel process which overcomes the above-mentioned disadvantages.

The process according to the invention for the selective removal, by means of a magnesium compound, of the arsenic which is solubilised in the hot oxidising attack on a uraniferous and/or molybdeniferous ore containing arsenical materials, by means of an aqueous liquor of sodium or potassium carbonate and/or bicarbonate, is characterised in that said arsenic which is solubilised in the attack operation is extracted in the form of magnesium arsenate by treating the carbonated and/or bicarbonated medium by means of a magnesium compound which is carbonated or which is capable of becoming carbonated by being introduced into said carbonated and/or bicarbonated medium.

In accordance with the invention, and in contrast to the known prior art is illustrated in particular by U.S. Pat. No. 2,079,805, the introduction of a magnesium compound into the medium resulting from the oxidising attack on an uraniferous and/or molybdeniferous ore containing arsenic, by means of an aqueous liquor comprising in solution at least one of the anions $CO_3^{--}$, $HCO_3^-$ and $OH^-$, without causing precipitation of magnesium uranate and/or molybdate, causes precipitation of the solubilised arsenic in the form of magnesium arsenate which can be extracted from the treatment medium by a solide-liquid separation operation, where in the solid phase which contains the magnesium arsenate precipitate can then be washed by means of water or a recycling liquor.

The magnesium compound may be introduced into the medium to be treated, in any region in an attack process. More precisely, the magnesium compound may be introduced eithr into the uraniferous and/or molybdeniferous ore attack region, or into the suspension resulting from the attack operation, or into all or a part of the uraniferous and/or molybdeniferous production liquor resulting from separation of the solid phase formed by sterile matter, or finally into all or a part of the production liquor after the uranium and/or molybdenum extraction treatments have been carried out.

When the magnesium compound is introduced into the region in which the arsenic-containing ore is subjected to the attack operation, it is generally introduced at the same time as the ore, and is subject to all the ore attack conditions. The resulting magnesium arsenate precipitate is extracted from the production cycle by separation of the solid and liquid phases which form the suspension resulting from the attack operation. In other words, the solid phase which is separated in the above-indicated manner is formed by sterile matter and magnesium arsenate.

After the solid phase has been separated, being impregnated with the liquid phase resulting from the ore attack operation, the solid phase is then subjected to a washing operation using water or a recycling liquor, and then the impregnation liquor which is displaced in that manner may be for example combined with the production liquor resulting from separation of the liquid and solid phases of the suspension originating from the attack operation, or recycled to the ore attack operation.

When the magnesium compound is introduced into the suspension resulting from the attack operation, it is generally so introduced after the suspension resulting from the attack operation has been adjusted to a temperature which is generally at most equal to the boiling temperature under normal pressure conditions. The resulting magnesium arsenate precipitate is then removed from the production cycle at the same time as the sterile matter by separation of the solid and liquid phases, the solid phase being subsequently subjected to a washing operation, with recovery of the impregnation liquor.

When the magnesium compound is introduced into a treatment region other than the ore attack region or the region in which the suspension resulting from the attack operation is recovered, the resulting magnesium arsenate precipitate is collected by a solid-liquid phase separation operation. As described hereinbefore, the separated solid phase is subjected to a washing operation using water or a recycling liquor in order to extract from that precipitate the impregnation liquor which has been retained. The washing liquid is then recycled to a selected point in the production cycle. The magnesium compound may be introduced into the medium to be treated in the form of an aqueous solution or in the form of a finely dispersed aqueous suspension or in the form of a powder, while the magnesium compound may be selected from the group formed by carbonated compounds of magnesium such as dolomite, magnesite, magnesium salts and magnesium oxide and hydroxide which are converted into a carbonated compound of magnesium in the carbonated and/or bicarbonated medium resulting from the ore attack operation.

The temperature at which the arsenical medium is treated by the magnesium compound depends on the region at which the compound is introduced.

When the magnesium compound is introduced into the attack medium itself, for example at the same time as the ore, the temperature at which the process for the selective removal of arsenical material is carried out is the temperature used in the course of the ore attack operation, that is to say, it is generally lower than 300° and is preferably from 60° C. to 220° C.

When the magnesium compound is introduced into the suspension resulting from the attack operation or into all or part of the uraniferous and/or molybdeniferous production ore, before or after the treatments for extracting the uranium and/or molybdenum therefrom, the temperature at which the process for treating the arsenical medium with the magnesium compound is carried out is at most equal to boiling temperature, but is preferably from 20° C. to 90° C.

The amount of magnesium compound which is generally used for precipitating the arsenic is close to the stoichiometric amount required for removing it in the form of magnesium arsenate.

When the amount of magnesium compound is greater than the stoichiometric amount, the excess magnesium is collected in the form of a precipitate of magnesium hydroxide and/or carbonate, at the same time as the magnesium arsenate precipitate. The magnesium arsenate precipitate which is generally separated from the treated medium may be subjected to a washing operation to collect the impregnation mother liquor, the liquor collected after the washing operation being reintroduced into the production cycle.

As is well known, the oxidising attack on uraniferous and/or molybdeniferous ores containing arsenic is carried out in the presence of free oxygen which is introduced in the form of a gas containing oxygen such as air, oxygen-enriched air or just oxygen alone. The gas is blown in under a pressure such that the oxygen partial pressure in the reaction vessel is in the range of from 0.1 to 20 bars but preferably from 5 to 15 bars.

The aqueous liquor to be purified essentially contains at least one of the following compounds: sodium or potassium bicarbonate, carbonate or hydroxide. Depending on the nature of the ore subjected to the attack operation and the nature of the liquor to be treated, the concentration of said liquor may vary within wide limits, in regard to each of the reactants present. Thus, the concentration in respect of $HCO_3^-$ may vary between 2 g/l and 100 g/l but preferably between 5 g/l and 80 g/l, while the concentration in respect of $CO_3^{--}$ may be in the range of from 0 g/l to 80 g/l but preferably from 1 g/l to 50 g/l, and the concentration in respect of $OH^-$ may be in the range of from 0 g/l to 20 g/l but preferably from 0 g/l to 10 g/l.

It may also be an attractive proposition for $CO_2$ gas to be blown into the reaction medium while the attack operation is being carried out. Blowing in carbon dioxide gas in this way may be effected continuously or intermittently, at a constant or variable flow rate.

Thus, the injection of $CO_2$ gas permits the amount of $HCO_3^-$ in the reaction medium to be both monitored and adjusted, and that amount may be altered by virtue of the fact that the amount of oxygen blown in may be greater than that which is actually necessary to permit oxidation.

The range of temperatures which are generally employed for attacking uraniferous and/or molybdeniferous ores is generally below 300° C. but it is preferably between 60° C. and 220° C.

Finally, when dealing with certain ores, it may be found advantageous for a conventional oxidation catalyst to be introduced into the reaction medium, to improve the attack mechanism.

In practice, the process according to the invention may also include one or more preliminary treatments of the ore before the ore is subjected to the attack operation in the true sense, depending on the above-mentioned conditions and the treatment for removing arsenic. First of all, it may be found necessary for the ore to be subjected not to a normal crushing operation but to a crushing operation which is taken to a particularly advanced stage, in order to multiply the interfaces between the grains of the ore and the attack liquor. Likewise, it may be advantageous for the organic substances contained in the ore to be moved in a preliminary step, by controlled-temperature calcination.

Finally, in some cases, it is found advantageous to carry out a preliminary treatment for physical enrichment of the ore using methods which are known to the man skilled in the art such as for example flotation.

It will be apparent that the various preliminary treatments may be combined together, even when carrying out an attack operation in a counter-flow mode.

The advantages of the process according to the invention will be more clearly apparent from the following Examples which are given by way of illustration.

Figure 2:
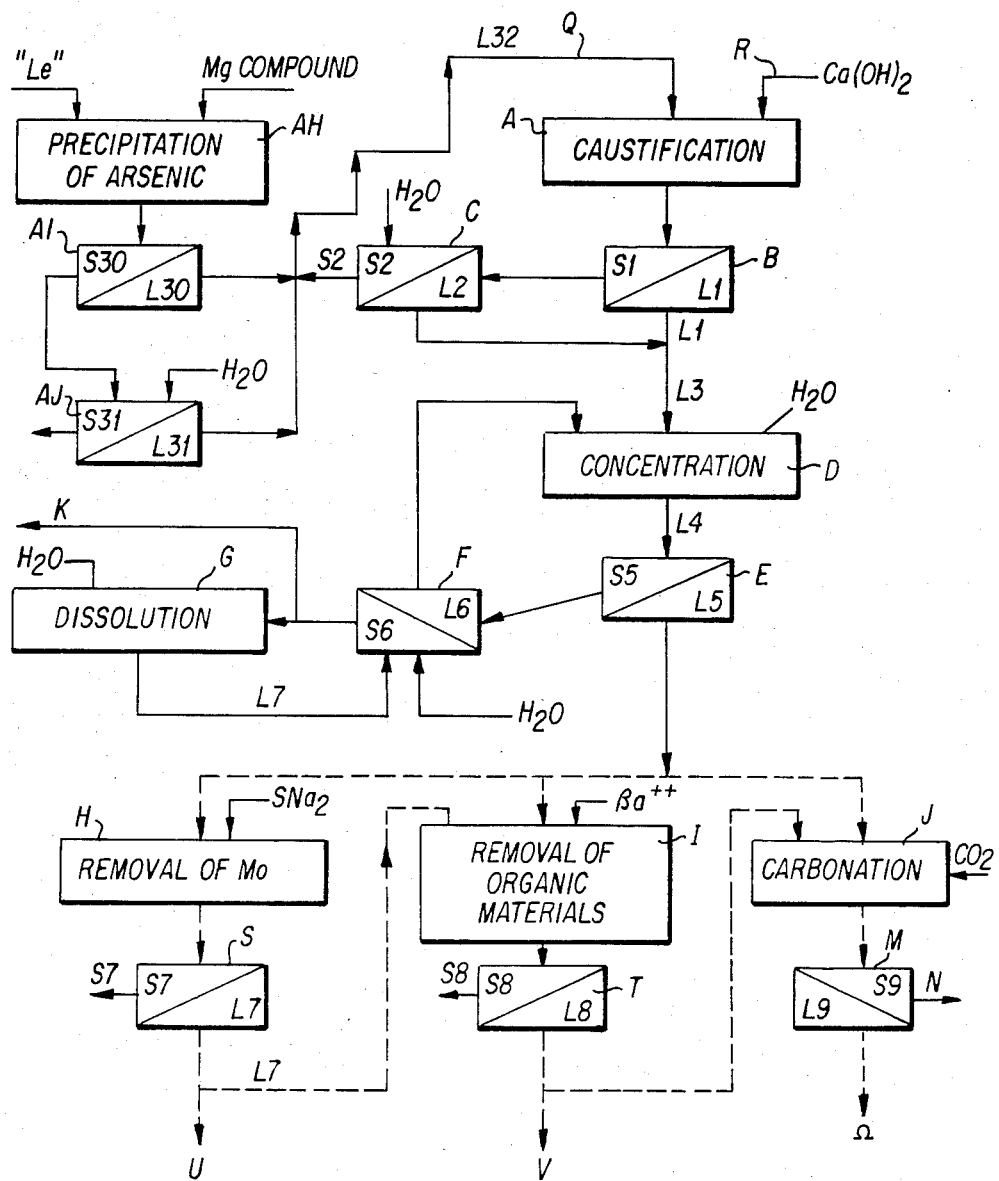

The invention will be better appreciated from the description of FIGS. 1 and 2:

FIG. 1 is a diagrammatic view of the process for the carbonated attack on a uraniferous ore which also contains arsenic and organic materials, wherein the selective removal of arsenical materials is carried out on the liquor recycled to the attack operation, and FIG. 2 is a diagrammatic view of the process according to the invention, showing in solid lines the circuit used when the operation of removing arsenic is effected on the whole of a uraniferous production liquor after it has been subjected to the treatment for extracting the major part of the uranium which is dissolved in the attack operation. Thus, that liquor which results from the operation of putting the uranium into the form of a useful product contains, besides arsenic and a small amount of uranium, alkali metal carbonate, sulphate, hydroxide or hydrogen carbonate and possibly molybdenum and other inorganic and/or organic impurities.

Referring to FIG. 1, the uraniferous ore which is in divided form and which contains troublesome organic and arsenical materials is introduced at A with the attack liquor $L_9$ at the same time as oxygen is blown into the reaction medium. After cooling, the slurry produced after the attack operation is introduced into B for separation of a cake $S_1$ formed by the mixture of the sterile fraction and the uranium precipitate, and the aqueous liquor $L_1$ which contains, in solution, alkali metal carbonate and bicarbonate, uranium and organic materials which were solubilised in the attack operation.

The mother liquors of the cake $S_1$ are displaced in C by means of a recycled washing liquor $L_{11}$.

The mixture $L_5$ of the liquors $L_1$ and $L_2$ is displaced to P where the arsenical materials are precipitated by means of a magnesium compound.

The suspension resulting from precipitation in P is then introduced into Q for separation of a cake $S_{30}$ which essentially comprises magnesium arsenate and a liquor $L_{30}$ which is recycled to H. The mother liquors of the cake $S_{30}$ are displaced in R by means of water which is introduced, and the liquor $L_{31}$ resulting therefrom is combined with the liquor $L_{30}$, forming the liquor $L_{32}$ which is displaced in H where the organic materials are treated by means of an oxidising agent, giving a purified liquor $L_{33}$.

The cake $S_2$ resulting from the washing operation in C is introduced into D for re-dissolution of the uranium precipitate in a suitable liquor formed by the mixture of two recycled liquors $L_{10}$ and $L_6$.

The liquor $L_{10}$ is of the same composition as the above-mentioned liquor $L_{11}$. When re-dissolution of the uraniferous ions is concluded, the resulting slurry is treated in E, for separation of a cake $S_3$ and a liquor $L_3$.

The cake $S_3$ which is essentially formed by sterile matter is displaced to F where it is subjected to washing with water, with the washing liquor $L_4$ being recycled to C and D, as fractions $L_{10}$ and $L_{11}$.

The liquor $L_3$ which has a high content of dissolved uranium, in the form of an alkali metal uranyl carbonate, is divided into two unequal fractions, one fraction $L_6$ being recycled to D for re-dissolution of the uranium, while the other fraction $L_7$, which is the larger fraction, forms the production liquor from which the uranium is extracted in G by a process which is not described herein, while the resulting liquor $L_8$ with its reduced uranium content and freed of the impurities resulting from the uraniferous ore by a known process which is not described wherein, is recycled to A to form, mixed with the liquor $L_{33}$, the attack liquor $L_9$.

Referring to FIG. 2, the solutions Le to be treated, which are produced by putting the uranium dissolved in the attack operation in the form of a useful product and which also contain arsenic are introduced into AH, as well as the magnesium compound. The slurry which is produced in that manner, by virtue of precipitation of magnesium arsenate, is introduced into the vessel AI for separation of a cake $S_{30}$ and a liquor $L_{30}$ which is to be caustified.

The cake $S_{30}$ is introduced into the region AJ where a washing operation using water is optionally carried out, to extract the impregnation mother liquors. After separation of the washed cake $S_{31}$ and the liquor $L_{31}$ bearing the impregnation mother liquors, the liquor $L_{31}$ is combined with the liquor $L_{30}$, giving an alkaline liquor $L_{32}$ which is to be caustified.

The liquor $L_{32}$ is then introduced into A together with the lime required for caustification thereof. The slurry produced after treatment by means of the lime is introduced into the region B for separation of a cake $S_1$ and a liquor $L_1$ containing certain solubilised impurities. The mother liquors of the cake $S_1$ are extracted in C by means of an amount of water which is introduced at that point. After extraction in this way, the mother liquors $L_2$ are mixed with the liquor $L_1$, forming the liquor $L_3$. The resulting cake $S_2$ which is extracted from C essentially comprises calcium carbonate.

The liquor $L_3$ which is formed by the mixture of liquors $L_1$ and $L_2$ is passed into D for concentration in respect of free sodium hydroxide by the evaporation of water, causing precipitation of sodium sulphate.

The slurry $L_4$ issuing from the concentration operation is introduced into E for separation of a liquor $L_5$ and a cake $S_5$.

The cake $S_5$ which essentially comprises sodium sulphate is entrained into F where it undergoes rinsing either using water or using a sodium sulphate-saturated solution, with recycling of the rinsing liquor $L_6$ to D.

The cake $S_6$ which is impregnated with the rinsing liquor may be removed from the treatment cycle at K or part thereof may be introduced with water into G for preparation of the rinsing solution $L_7$ which is to be used in F.

The free sodium hydroxide-rich liquor $L_5$ issuing from E may contain, in solution, impurities such as for example molybdenum, and various organic and inorganic salts that it may be desirable to remove.

If the molybdenum is to be removed from the liquor $L_5$, the liquor $L_5$ is introduced into H with the required amount of $Na_2S$. The slurry produced in that manner is introduced into S for preparation of the solid phase formed by molybdenum sulphide which is removed and the phase $L_7$ which may be collected in U or else recycled to another stage in the process such as I or J.

If the organic materials present are to be removed from the liquor $L_5$, the liquor $L_5$ is introduced into I with for example a suitable amount of a barium compound, to cause precipitation of barium organates. The slurry from I is then introduced into T for separation of a cake $S_8$ and a liquor $L_8$ which may be collected in V or else recycled to another stage in the process such as for example J.

Likewise, if it is desirable for the sodium hydroxide-rich liquor $L_5$ to be carbonated, the liquor is introduced into J in order to undergo carbonation therein, by blowing in $CO_2$. The resulting slurry may be used in the form in which it is produced or it may be treated in M to separate the cake $S_9$ formed by sodium carbonate and/or bicarbonate and a carbonated liquor $L_{10}$ which may be collected in $\Omega$ or recycled to J.

However, it will be apparent that the sodium hydroxide-rich liquor $L_5$ may be successively subjected to two of the three treatments referred to above, depending on the impurities which are to be removed and depending on the uses for which the liquor is intended after purification. For example, the operations of removing molybdenum and organic materials may be combined in series: in that case, an aliquot part of the whole of the liquor $L_7$ from the molybdenum removal operation in S is introduced into I and then into T in order to have organic materials removed therein. Conversely, the operation of removing organic materials may precede the operation of removing molybdenum. It is also possible for the operation of removing the organic materials and the operation of carbonating the liquor to be carried out in succession: in that case, an aliquot part or the whole of the liquor $L_8$ from T where the organic materials are removed is introduced into J in order to undergo the desired carbonation operation therein.

EXAMPLE 1

A uraniferous ore containing arsenic and of the following composition by weight after drying was treated in accordance with the process of the present invention:

Uranium—0.22%
Arsenic—0.94%
$SiO_2$—75.0%
$Al_2O_3$—13.8%
$Fe_2O_3$—1.6%
$Na_2O$—0.15%
$K_2O$—2.8%
$TiO_2$—0.45%
$P_2O_5$—0.1%
$V_2O_5$—0.02%
Mo—0.15%
S—0.20%

Various—4.57%

100 kg of the above-indicated dry ore was crushed to a grain size of 160 μm and then introduced into an autoclave with 2.0 kg of finely divided $Mg(OH)_2$ and 110 kg of an attack liquor containing 7.0 kg of $NaHCO_3$ and 5.0 kg of $Na_2CO_3$ and 1.0 kg of $Fe(OH)_3$ as an oxidation catalyst.

The autoclave was heated in such a way that the reaction medium was at a temperature of 180° C., while oxygen was injected at a flow rate of 30 $Nm^3/h$, which bubbled into the pulp. The total pressure obtaining in the autoclave during the oxidising attack operation was 20 bars.

After a period of 2 hours, the autoclave was cooled to a temperature of 60° C. and emptied.

The resulting suspension was subjected to a separation step, and an aqueous liquor containing the solubilised uranium, referred to as the production liquor, and a solid fraction impregnated with the production liquor, were collected.

In this way, 80 liters of mother liquor, of the following composition, was collected:
  $Na_2CO_3$—18.2 g/l
  $NaHCO_3$—83.2 g/l
  Uranium—1.9 g/l
  Arsenic—2.72 g/l
  $Na_2SO_4$—8.05 g/l The solid fraction collected was subjected to a washing operation using 80 kg of water, and 85 liters of a washing liquor, of the following composition, was collected:
  $Na_2CO_3$—6.4 g/l
  $NaHCO_3$—29.3 g/l
  Uranium—0.67 g/l
  Arsenic—0.96 g/l
  $Na_2SO_4$—2.83 g/l The mother liquor and the washing liquor were then mixed, thereby giving 165 liters of a uranium production liquor which was of the following composition:
  $Na_2CO_3$—12.1 g/l
  $NaHCO_3$—55.5 g/l
  Uranium—1.26 g/l
  Arsenic—1.8 g/l
  $Na_2SO_4$—5.36 g/l which was subsequently treated with 5.7 kg of NaOH in aqueous solution, giving 0.3 kg of a wet sodium uranate precipitate which after washing by means of 1.5 liters of water, had an arsenic content of 0.15%, which complies with the standards of commercial purity which are generally accepted in regard to that substance.

The washed solid fraction resulting from the operation of separating the liquid and solid phases of the suspension resulting from the attack operation represented, in the dry condition, a mass of 102 kg, and was of the following composition:
  $SiO_2$—75.0 kg
  Arsenic—0.57 kg
  Magnesium—0.83 kg
  Uranium—0.01 kg
  various—25.6 kg In order to test the efficiency of the process according to the invention, 100 kg of the same arsenic-bearing uraniferous ore was subjected to the same attack conditions, but without any magnesium compound.

After separation of the suspension resulting from the attack operation and washing of the separated solid fraction by means of 80 liters of water, 80 liters of a mother liquor and 85 liters of a washing liquor which were of the following composition, were collected:

For the mother liquor:
  $Na_2CO_3$—9.3 g/l
  $NaHCO_3$—97.3 g/l
  Uranium—1.9 g/l
  Arsenic—7.86 g/l
  $Na_2SO_4$—8.04 g/l For the washing liquor:
  $Na_2CO_3$—3.28 g/l
  $NaHCO_3$—34.3 g/l
  Uranium—0.67 g/l
  Arsenic—2.77 g/l
  $Na_2SO_4$—2.83 g/l Mixing the two liquors indicated above gave a production liquor of the following composition:
  $Na_2CO_3$—6.2 g/l
  $NaHCO_3$—64.8 g/l
  Uranium—1.26 g/l
  Arsenic—5.24 g/l
  $Na_2SO_4$—5.35 g/l The above-indicated production liquor which was subsequently treated by means of 5.7 kg of NaOH in aqueous solution, gave 0.31 kg of a wet sodium uranate precipitate which, after washing with 1.5 kg of water, still contained 1.2% by weight of arsenic with respect to the weight of dry sodium uranate, requiring a further uranium purification operation.

EXAMPLE 2

By attacking the same uraniferous ore as in Example 1, in the same manner, using an attack liquor of the same composition, but without introducing the magnesium compound, the result was a production liquor formed by the mixture of the mother liquor isolated by separation, and the liquor for washing the separated sterile matter.

The above-mentioned production liquor, of which a volume of 100 liters was used, was of the following composition:
  $Na_2CO_3$—6.2 g/l
  $NaHCO_3$—64.8 g/l
  Uranium—1.26 g/l
  Arsenic—5.24 g/l
  $Na_2SO_4$—5.35 g/l The production liquor was treated with 1.2 kg of $Mg(OH)_2$ in finely divided form at a temperature of 60° C. in a reaction vessel which was subjected to agitation, for a period of 2 hours.

The resulting suspension was subjected to a separation operation, and 99 liters of a uraniferous liquor from which arsenic had been removed, on the one hand, and 2 kg of a dry mixture of magnesium arsenate and the excess of unreacted magnesium hydroxide, on the other hand, were collected.

The composition of the purified liquor was as follows:
  $Na_2CO_3$—12.0 g/l
  $NaHCO_3$—55.3 g/l
  Uranium—1.25 g/l
  Arsenic—1.5 g/l
  $Na_2SO_4$—5.4 g/l The dry cake was formed by:
  Arsenic—18.7%
  magnesium—25.0%
  various (linking anions, moisture, etc):—56.3%

Thus, the process according to the invention provided a uraniferous production liquor from which sufficient arsenic had been removed, to give a sodium uranate precipitate which, after washing, contained 0.14% of arsenic, thereby complying with the standards in respect of commercial purity which are generally applied to that substance.

We claim:

1. A process for the selective removal of arsenical material, by means of a magnesium compound, in the course of a process for the hot oxidising attack on a uraniferous and/or molybdeniferous ore containing arsenical materials, comprising attacking said ore by means of an aqueous liquor of sodium or potassium carbonate and/or bicarbonate thereby forming a carbonated and/or bicarbonated medium containing arsenic, said attack operation being carried out under conditions with respect to levels of concentration, temperatures and pressures which cause solubilisation of the uranium and/or molybdenum and the arsenic present in the ore, then collecting a suspension of a solid phase in a liquid phase, and finally separating said phases, wherein the arsenic which is solubilised in the attack operation is extracted in the form of magnesium arsenate by treating the carbonated and/or bicarbonated medium containing arsenic with a magnesium compound which is carbonated or which is converted to a carbonated compound in said medium.

2. A process for the selective removal of arsenical materials, according to claim 1, wherein the magnesium compound is introduced in the ore attack operation.

3. A process for the selective removal of arsenical materials, according to claim 1, wherein the magnesium compound is introduced into the suspension resulting from the attack operation.

4. A process for the selective removal of arsenical materials, according to claim 1, wherein the magnesium compound is introduced into all or part of the uraniferous and/or molybdeniferous liquor resulting from the operation of separating the liquid and solid phases of the suspension resulting from the attack operation.

5. A process for the selective removal of arsenical materials, according to claim 1, wherein the magnesium compound is introduced into all or part of the uraniferous and/or molybdeniferous liquor resulting from the attack operation after extraction of the desired element or elements from the uraniferous and/or molybdeniferous ore.

6. A process for the selective removal of arsenical materials, according to claim 1, wherein the magnesium compound is selected from the group consisting of dolomite, magnesite, magnesium salts and magnesium oxides and hydroxides.

7. A process for the selective removal of arsenical materials, according to claim 1, wherein the temperature at which the arsenical medium is treated with the magnesium compound when the magnesium compound is introduced into the attack medium is at most equal to 300° C. and is preferably from 60° C. to 220° C.

8. A process for the selective removal of arsenical materials, according to claim 1, wherein the temperature at which the arsenical medium is treated with the magnesium compound when the magnesium compound is introduced into a region other than the attack region is at most equal to the boiling temperature and is preferably from 20° C. to 90° C.

9. A process for the selective removal of arsenical materials, according to claim 1, wherein the aqueous liquor to be purified of arsenical materials contains at least one of the compounds sodium or potassium bicarbonate, Na or K carbonate and Na or K hydroxide.

10. A process for the selective removal of arsenical materials, according to claim 9, wherein, except for the arsenic present, the concentration of $HCO_3^-$ in the liquor to be purified may vary between 2 g/l and 100 g/l and preferably between 5 g/l and 80 g/l, while the concentration of $CO_3^{--}$ may vary between 0 g/l and 80 g/l and preferably between 1 g/l and 50 g/l, and the concentration of $OH^-$ is between 0 g/l and 20 g/l and preferably 0 g/l and 10 g/l.

* * * * *